United States Patent
Ammon et al.

(10) Patent No.: US 9,121,535 B2
(45) Date of Patent: Sep. 1, 2015

(54) COUPLING UNIT

(75) Inventors: Edgar Ammon, Remshalden (DE); Thomas Fallscheer, Stuttgart (DE); Ralf Frommer, Fellbach (DE); Annett Overheu, Remseck (DE); Thomas Pröttel, Esslingen (DE); Jürgen Stehlig, Neckartenzlingen (DE)

(73) Assignee: Mahle International GmbH (DE)

( * ) Notice: Subject to any disclaimer, the term of this patent is extended or adjusted under 35 U.S.C. 154(b) by 396 days.

(21) Appl. No.: 12/937,168

(22) PCT Filed: Feb. 25, 2009

(86) PCT No.: PCT/EP2009/052191
§ 371 (c)(1),
(2), (4) Date: Dec. 22, 2010

(87) PCT Pub. No.: WO2009/124805
PCT Pub. Date: Oct. 15, 2009

(65) Prior Publication Data
US 2011/0148108 A1   Jun. 23, 2011
US 2012/0038153 A9   Feb. 16, 2012

(30) Foreign Application Priority Data
Apr. 10, 2008 (DE) .................. 10 2008 018 426

(51) Int. Cl.
F16L 37/091 (2006.01)
F16L 37/098 (2006.01)

(52) U.S. Cl.
CPC ........... *F16L 37/091* (2013.01); *F16L 37/0987* (2013.01); *F16L 2201/60* (2013.01)

(58) Field of Classification Search
CPC .. F16L 37/091; F16L 37/0958; F16L 37/0987
USPC ........................ 285/307, 314, 340
See application file for complete search history.

(56) References Cited

U.S. PATENT DOCUMENTS

| | | | |
|---|---|---|---|
| 3,339,944 A * | 9/1967 | Poague | 285/39 |
| 4,696,497 A * | 9/1987 | Schwarzensteiner | 285/307 |
| 6,129,390 A * | 10/2000 | Ohlsson | 285/39 |
| 6,231,090 B1 | 5/2001 | Fukao et al. | |
| 6,499,771 B1 * | 12/2002 | Snyder et al. | 285/319 |
| 7,273,237 B1 * | 9/2007 | Plattner | 285/321 |
| 2001/0040377 A1 | 11/2001 | Bandlow et al. | |

FOREIGN PATENT DOCUMENTS

| | | |
|---|---|---|
| DE | 19756987 A1 | 7/1999 |
| GB | 2273965 A | 7/1994 |
| WO | WO-2007004880 A2 | 1/2007 |

* cited by examiner

*Primary Examiner* — James Hewitt
(74) *Attorney, Agent, or Firm* — Fishman Stewart Yamaguchi PLLC

(57) ABSTRACT

A coupling unit having at least one tubular section; a casing; at least one detent ring, which is arranged radially between the casing and the at least one tubular section when the at least one tubular section, is inserted in the casing, wherein the at least one detent ring, the casing, and the at least one tubular section are configured to adapt to one another such that the tubular section is inserted axially into the casing in a first relative rotational position of the tubular section and the casing, wherein the tubular section is secured by the detent ring against axial withdrawal, the casing and tubular section can be rotated relative to one another, and wherein for decoupling purposes, the tubular section can be withdrawn axially from the casing in a second relative rotational position of the casing and the tubular section that differs from the first rotational position.

17 Claims, 3 Drawing Sheets

COUPLING UNIT

CROSS-REFERENCES TO RELATED APPLICATIONS

This application claims priority to German patent application DE 10 2008 018 426.8 filed on Apr. 10, 2008, and PCT/EP2009/052191 filed on Feb. 25, 2009, both of which are hereby incorporated by reference in their entirety.

TECHNICAL FIELD

The present invention relates to a coupling unit for connecting a fluid line to another fluid line or a fluid connection.

BACKGROUND

In many different application forms, fluid conducting lines, thus fluid lines with other fluid lines or with connections which run to a fluid source or a fluid sink, have to be connected in a communicating manner. For this, various connecting techniques, in particular coupling units, are known. In certain applications, little installation space is available for establishing or detaching such a connection. Furthermore, for a series production it can be desired to keep the assembly of the connection as simple as possible. In particular for motor vehicles it can be required to connect gas-conducting lines in an engine compartment with other gas-conducting lines or with adequate connections.

SUMMARY

The present invention is concerned with the problem to provide for a coupling unit of the above mentioned type, an improved embodiment which is in particular characterized in that coupling for establishing the connection can be implemented in a particularly simple manner even in confined space conditions wherein, in particular, a secured connection is to be implemented. Furthermore, an inexpensive producibility of the coupling unit is desired.

According to the invention, this problem is solved by the subject matter of the independent claim. Advantageous embodiments are subject matter of the dependent claims.

The invention is based on the general idea to equip the coupling unit with a casing, at least one tubular section, and at least one detent ring arranged between casing and tubular section, wherein these components are designed and adapted to one another in such a manner that, in a first rotational position, the tubular section can be axially inserted for coupling purposes into the casing and is secured in the inserted state by means of the detent ring against axial withdrawal, wherein the tubular section is released in a second rotational position and can be axially withdrawn from the casing. In other words, the connection is established by axially inserting the tubular section into the casing without the need of a rotational movement. At the same time, an axial locking against withdrawal of the tubular section from the casing is achieved which takes place through interaction between casing, tubular section and detent ring. This locking against withdrawal can be released or unlocked by rotating of casing and tubular section relative to one another so that the tubular section can be withdrawn again from the casing without any problems.

Within a series assembly, for example of vehicles, thus, lines can be connected to one another or to connections by means of said coupling unit simply by insertion. This can be implemented comparatively quickly even in very confined and/or barely accessible assembly situations. For this purpose, the tubular section is arranged, for example, at a fluid line while the casing is arranged at another fluid line or a fluid connection.

In a particularly advantageous embodiment, the coupling unit can comprise two tubular sections and two detent rings which interact with a common casing. Here, the one tubular section can be inserted on the one side into the casing and can be secured with the detent ring, while the other tubular section can be inserted on the other side into the casing and can be secured with the other detent ring. For example, in this manner, two fluid lines can each be provided with one such tubular section and can each be fluidically coupled via the casing by axial insertion, thus without rotational movement. For decoupling said connection, the casing has only to be rotated relative to the two tubular sections until both tubular sections are unlocked so that it is possible again to axially withdraw them from the casing. In this manner, also such lines can easily be connected to one another and separated from one another which can not be rotated or only against high resistance.

Further important features and advantages arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the scope of the present invention.

Preferred exemplary embodiments of the invention are illustrated in the drawings and are explained in the following description in more detail, wherein identical reference numbers refer to identical, or similar, or functionally identical components.

BRIEF DESCRIPTION OF THE DRAWING

In the figures, schematically.

DETAILED DESCRIPTION

Figure 1:
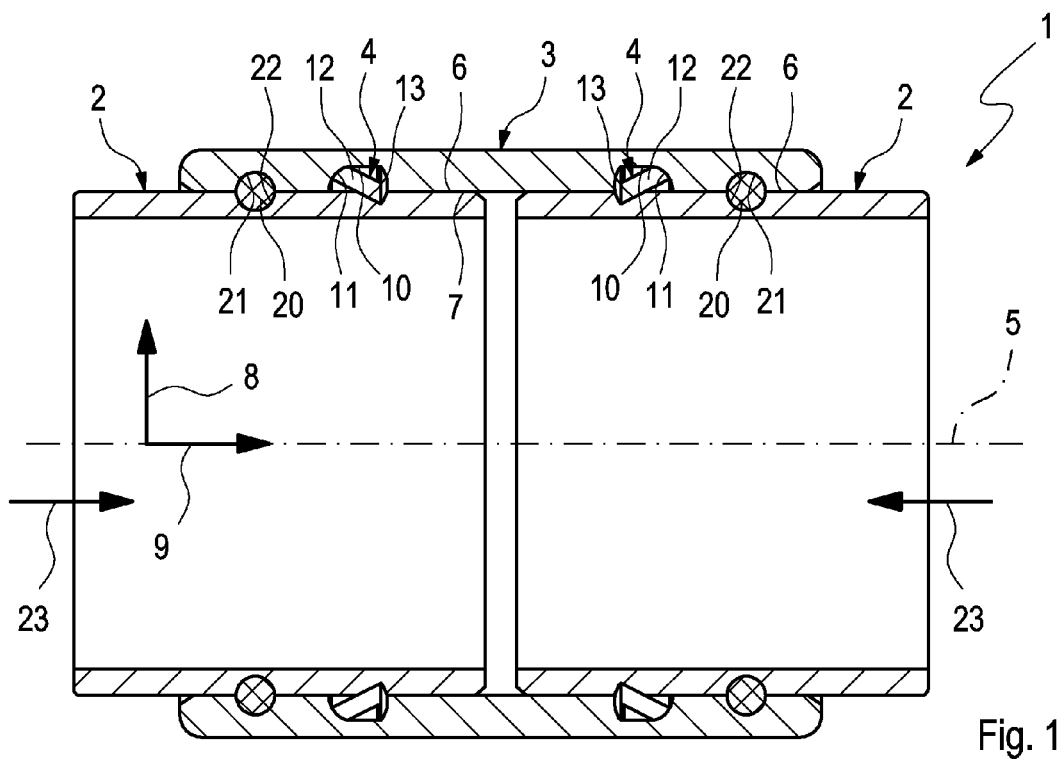
FIG. 1 shows a greatly simplified longitudinal section through a coupling unit.
Figure 2:
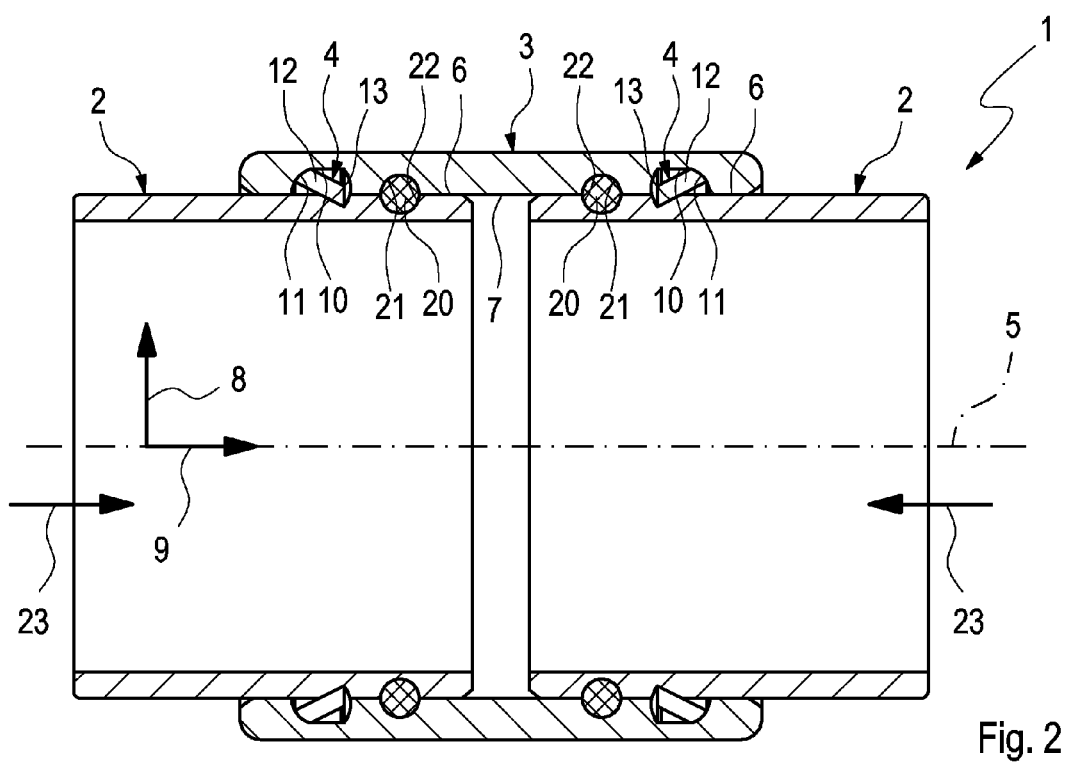
FIG. 2 shows a longitudinal section as in FIG. 1 but for a different embodiment.

According to FIGS. 1 and 2, a coupling unit 1 comprises at least a tubular section 2, a casing 3, and at least a detent ring 4. In the shown embodiments, the coupling unit 1 has two tubular sections 2 and two detent rings 4 which interact with a common casing 3. In another embodiment, the coupling unit 1 can be configured in such a manner that the casing 3 has only one single tubular section 2 and only one single detent ring 4. This simple variant, for example, can be mirrored at a plane which runs perpendicular to a longitudinal center axis 5 of the coupling unit to implement the double variant shown here. Also, configurations having more than two tubular sections 2 and more than two detent rings 4 are principally also conceivable; for example, the casing 3 can be configured as Y-shaped housing with three connecting points, or as X-shaped housing with four connecting points, or as star-shaped housing with even more connecting points.

The coupling unit 1 serves for connecting a line, which is not shown here and which conducts a fluid, in particular a gas or a liquid, thus a fluid line, to another fluid line or to a fluid connection by means of which the respective fluid line is connectable, e.g., to a fluid source or a fluid sink. The respective fluid line or the respective fluid connection is not illustrated here. The respective fluid line is fixedly connected in a suitable manner to the respective tubular section 2. Also, the respective tubular section 2 can form an end section integrally formed at the respective fluid line. Also, the casing 3 can be fixedly connected to the respective fluid line or can form an end section integrally formed thereon. The same applies to the potentially existing fluid connection which is fixedly connected either to the casing 3 or the respective tubular section 2 or is equipped therewith in an integral manner.

The respective tubular section 2 has a cylindrical outer contour 6. The casing 3 has a cylindrical inner contour 7 which is designed complementary to the respective outer contour 6 in such a manner that the respective tubular section 2 can be inserted axially into the casing 3. Except for a certain radial play, the inner contour 7 corresponds substantially to the respective outer contour 6. In the shown examples, the cross-sections of the two tubular sections 2 are selected such that they are of the same size. It is clear that for another embodiment, differently dimensioned cross-sections for the outer contours 6 of the two tubular sections 2 can principally also be implemented. In this case, the casing 3 has, e.g., an inner contour 7 which has different cross-sections at two axial sections. Further, in the shown examples, the outer contour 6 of the respective tubular section 2 is substantially equipped with a constant cross-section in axial direction. In another embodiment, a cross-sectional profile in axial direction with a single step or multiple steps is also conceivable for the respective outer contour 6. In this case, the inner contour 7 or the respective section of the inner contour 7 is then shaped correspondingly.

The respective detent ring 4 is arranged radially between casing 3 and the respective tubular section 2 once the respective tubular section 2 is axially inserted into the casing 3. The radial direction is designated in the FIGS. 1 and 2 by an arrow 8 while the axial direction is designated with an arrow 9.

The casing 3, the respective detent ring 4 and the respective tubular section 2 are configured and adapted to one another in such a manner that, in a first relative rotational position of tubular section 2 and casing 3, the tubular section 2 can be axially inserted for coupling purposes into the casing 3, namely far enough that the respective tubular section 2 is latched via the associated detent ring 4 with the casing 3. Through this latching, the respective tubular section 2 is secured in the first rotational position by the respective detent ring 4 in the casing 3 against axial withdrawal. It is remarkable that for coupling, thus for establishing the fluidic connection between casing 3 and tubular section 2, no rotational movement about the longitudinal center axis 5 between casing 3 and tubular section 2 has to be carried out. Furthermore, the casing 3, the respective tubular section 2 and the respective detent ring 4 are adapted to one another or configured in such a manner that, in the inserted state, the casing 3 and the respective tubular section 2 can be rotated relative to one another about the longitudinal center axis 5 in such a manner that a second relative rotational position of the casing 3 and the respective tubular section 2 can be set which differs from the first rotational position and in which it is possible to axially withdraw the respective tubular section 2 from the casing 3. In this manner, the fluidic connection between casing 3 and tubular section 2 can thus be decoupled. By means of the rotation between casing 3 and tubular section 2, the latching or securing generated by means of the detent ring can be released to allow the axial withdrawal of the tubular section 2.

The respective detent ring 4 is advantageously inserted into a ring groove 10 which is radially open. In the shown examples, the respective ring groove 10 is formed on the inner contour 7 of the casing 3. In another embodiment, the ring groove 10 can also be formed on the outer side 6 of the respective tubular section 2. The detent ring 4 inserted into the respective ring groove 10 is axially supported on a groove wall 11 which axially delimits the ring groove 10. Hereby, an intensive force transmission between detent ring 4 and the respective groove wall 11 can be achieved.

Figure 3:
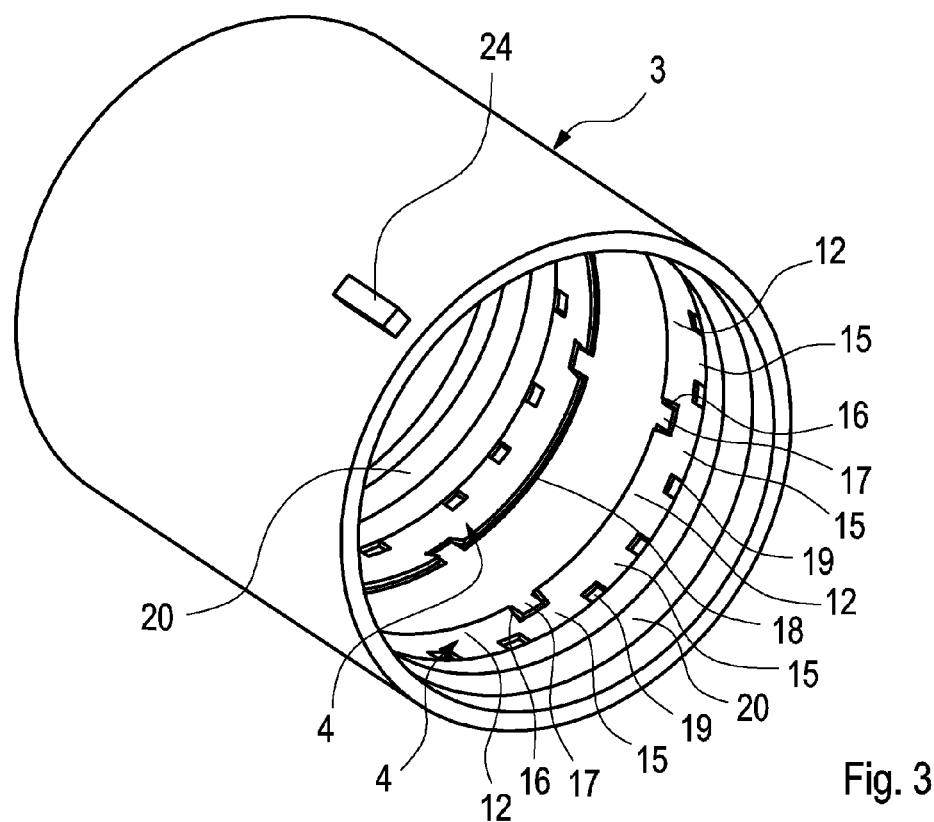
FIG. 3 shows a perspective view on a casing of the coupling unit.

In the embodiments shown here, the respective detent ring 4 has a plurality of detent elements 12 which, according to FIG. 3, are arranged adjacent to one another in circumferential direction. The detent elements 12 are arranged radially on the respective detent ring 4 in a spring-elastically resilient manner. Furthermore, they are dimensioned in such a manner that they project or protrude radially from the respective ring groove 10. In the inserted state of the respective tubular section 2 and in the first rotational position between casing 3 and the respective tubular section 2, each of the detent segments 12 engage with a detent contour 13 and is supported thereon in axial direction 9. Here too, an intensive force transmission between the respective detent ring 4 and the associated detent contour 13 can be implemented. In the shown examples, the respective detent contour 13 is formed on the outer side 6 of the respective tubular section 2. Also conceivable is an embodiment in which the respective detent contour 13 is formed on the inner side 7 of the casing 3.

Figure 5:
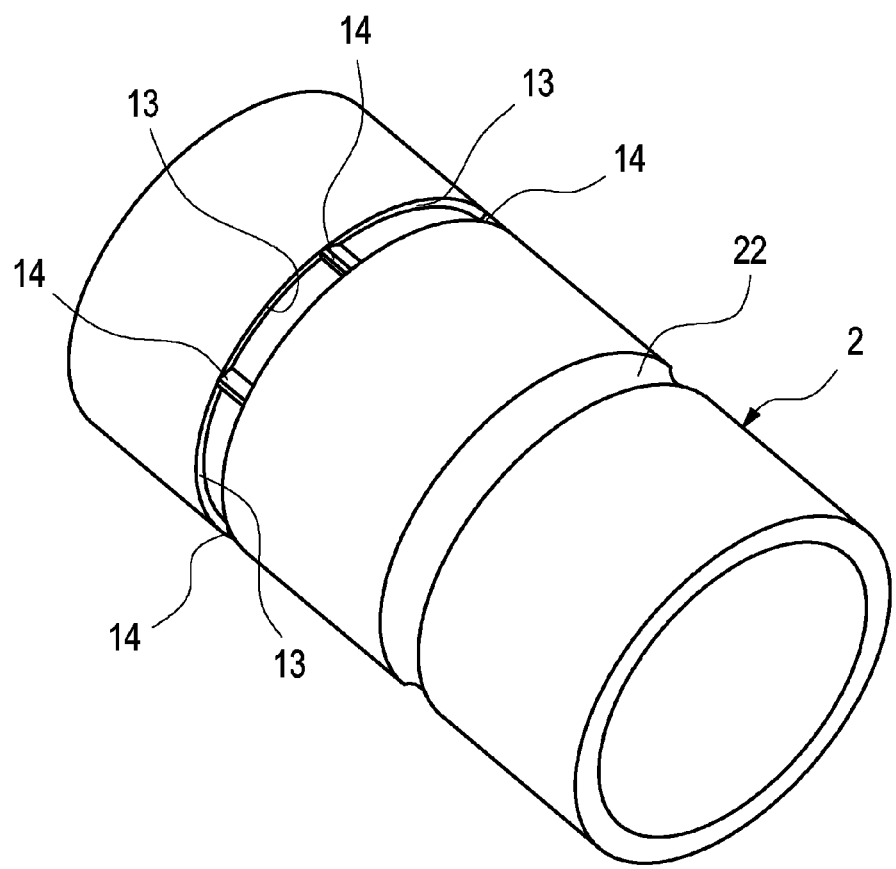
FIG. 5 shows a perspective view of a tubular section.

In order to be able to withdraw the respective tubular section 2 again from the casing 3, the detent segments 12 have to be moved out of the detent contours 13. For this purpose, suitable reset contours 14 are provided which, for example, can be formed according to FIG. 5 on the respective tubular section 2. Alternatively, the reset contours 14 can also be provided on the casing 3. However, here, they are arranged on the component that also comprises the detent contours 13. Advantageously, said reset contours 14 are on the same axial height as the detent contours 13, thus in the same axial section, wherein in each case one reset contour 14 is located in circumferential direction between two adjacent detent contours 13. Hereby, in the inserted state, the reset contours 14 are positioned in the first rotational position also in circumferential direction between two adjacent detent segments 12 of the detent ring 4. By rotating the casing 3 and tubular section 2, the reset contours 14 force or push the detent elements 12 into the ring groove 10. The reset contours 14 are dimensioned in such a manner that they push the detent segments 12 far enough into the ring groove 10 that they are released from the respective detent contour 13 or get out of it. To simplify the transition from the first rotational position into the second rotational position, the reset contours 14 can comprise insertion chamfers or ramps in circumferential direction. Additionally or alternatively, also the detent segments 12 can be provided in circumferential direction with insertion chamfers or ramps which facilitate a sliding in or sliding under of the reset contours 14 underneath the detent segments 12.

As soon as the second rotational position is reached by rotating casing 3 and tubular section 2, the reset contours 14 push the detent segments 12 far enough into the ring groove 10 or out of the detent contours 13 that the tubular section 2 is released and can be axially withdrawn from the casing 3.

According to FIG. 3, according to a preferred embodiment, the respective detent ring 4 can comprise a plurality of support segments 15 which are arranged on the detent ring's 4 side facing axially away from the detent segments 12 and which are adjacent to one another in the circumferential direction. The support elements 15 are axially supported within the ring groove 10 by the groove wall 11. In circumferential direction, the detent ring 4 has, at least between two adjacent detent elements 12, in each case one recess 16, respectively. Within the ring groove 10, projections 17 can be provided which each engage axially and radially with such a recess 16. Here, the respective projection 17 projects, for example, from a groove wall 18 which delimits the ring groove 10 in axial direction.

Through the engagement of the projections 17 with the recesses 16, a protection against rotation of the detent ring 4 relative to the ring groove 10 is generated, thus relative to the casing 3. Also, in a corresponding manner, one axial recess 19 can be provided in circumferential direction in each case at least between two adjacent support segments 15. Principally, on the groove wall 11 which axially supports the support segments 15, non-shown projections which engage with the recesses 19 can be provided to secure the detent ring 4 against rotation within the ring groove 10. Furthermore, the recesses 16 generate an increased spring elasticity between the detent segments 12, and the recesses 19 generate an increased spring elasticity between the support segments 15 within the detent ring 4. Said spring elasticity allows or promotes the assembly of the detent ring 4 and promotes the spring elasticity or the radial resilience of the detent segments 12.

According to the FIGS. 1 to 3, the coupling unit 1 can additionally be equipped with at least one seal 20 which is ring-shaped and acts in radial direction. In the example, two such seals 20 are provided which each are assigned to one of the tubular sections 2. In the embodiment shown in FIG. 1, the seals 20 are positioned before the respective detent ring 4 with respect to an insertion direction 23 indicated with an arrow. In the embodiment shown in FIG. 2, the seals 20 are behind the respective detent ring 4 with respect to the insertion direction 23. For fixation of the seals 20 on the respective tubular section 2 and on the casing 3, the casing 3 as well as the respective tubular section 2 can be equipped with adequate receiving grooves 21 or 22, respectively, in which approximately a half of each of the respective seals 20 immerges.

Figure 4:
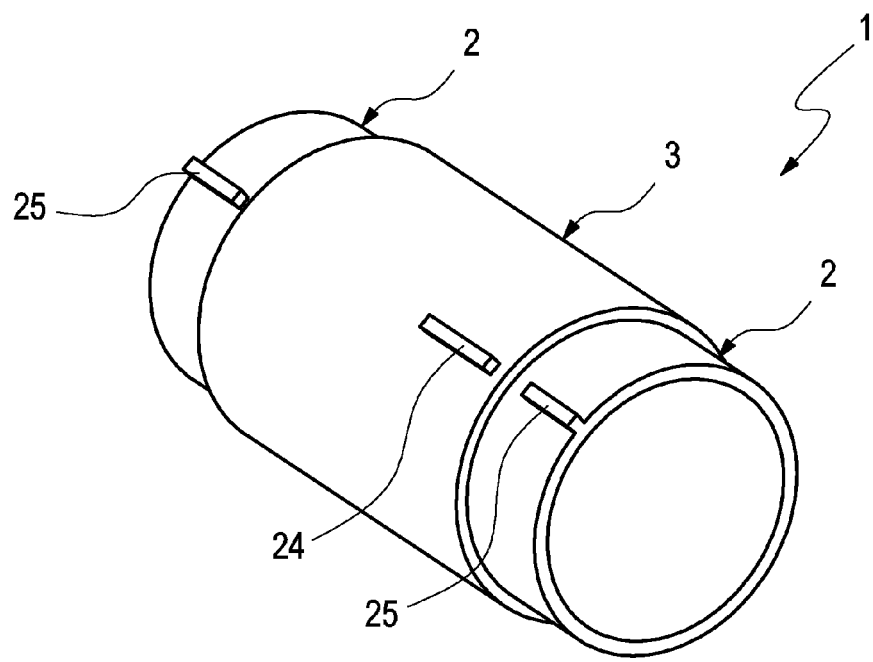
FIG. 4 shows a perspective view with tubular sections inserted into the casing.

According to FIG. 4, the casing 3 and the respective tubular section 2 can be equipped with markers 24 and 25, respectively. The same are configured in particular as haptically identifiable markers 24, 25; here, as an example, they are integrally formed on the casing 3 and the respective tubular section 2, respectively, and are, for example, configured as ribs extending in longitudinal or axial direction 9. They are—as illustrated in FIG. 4—oriented in alignment to one another if the casing 3 and the respective tubular section 2 are both in the first relative rotational position.

The respective fluid line can involve a pipe line or a hose line. The respective tubular section 2 and/or the respective detent ring 4 and/or the casing 3 can be made of metal or plastic.

The invention claimed is:

1. A coupling unit, comprising:
   a casing having an inner diameter surface with a ring groove formed therein;
   a detent ring having a plurality of support segments received in the ring groove of the casing, and the detent ring further having a plurality of detent segments extending radially inward from the support segments; and
   a tubular section having an outer diameter surface and an annular recess extending about a circumference of the outer diameter surface, and the tubular section further includes a plurality of reset contours that are disposed in the annular recess and circumferentially spaced apart from one another and a plurality of detent contours define a plurality of walls of the recess;
   wherein the tubular section is attached to the casing when the tubular section is disposed in a first relative rotational position with respect to the casing and inserted axially into the casing, such that the detent segments of the detent ring are configured to be received between the detent contours of the tubular section;
   wherein the support segments of the detent ring define a plurality of recesses therebetween, and the casing has a plurality of projections that are received in the recesses when the detent ring is received in the ring groove of the casing.

2. The coupling unit according to claim 1, wherein the tubular section in the inserted state is configured to be detached from the casing when the tubular section is rotated with respect to the casing from the first rotational position to a second rotational position, and the plurality of reset contours push the plurality of detent segments radially outward from the detent contours of the annular recess and into the ring groove of the tubular section and permit the tubular section to be withdrawn axially from the casing.

3. The coupling unit according to claim 1, further comprising at least one circular and radially acting seal disposed between the detent ring and an opening of the casing that receives the tubular section, and the opening is adjacent to the seal.

4. The coupling unit according to claim 1, wherein the reset contours extend radially outward at a height spanning the depth of the annular recess.

5. The coupling unit according to claim 4, wherein on a side axially facing away from the detent segments, the plurality of support segments are arranged adjacent in the circumferential direction and are axially supported within the ring groove of the casing.

6. The coupling unit according to claim 1, wherein the detent segments of the detent ring are spaced apart from another at a distance that one reset contour is located in each case at the axial height of the detent contours between the detent contours.

7. The coupling unit according to claim 6, wherein on a side axially facing away from the detent segments, the plurality of support segments are arranged adjacent in the circumferential direction and are axially supported within the ring groove of the casing.

8. The coupling unit according to claim 1, wherein a first at least one tubular section can be inserted on the one side into the casing and can be secured with a first at least one detent ring, while a second at least one tubular section can be inserted on the other side into the casing and can be secured with a second at least one detent ring.

9. The coupling unit according to claim 8, wherein the first at least one tubular section and the second at least one tubular section are collinear with respect to each other.

10. The coupling unit according to claim 1, further comprising at least one circular and radially acting seal disposed between the detent ring and an opening of the casing that receives the tubular section, and the opening is adjacent to the seal.

11. The coupling unit according to claim 1, wherein the tubular section is connected to one of a fluid line and a fluid connection, and wherein the casing is connected to the other of the fluid line and the fluid connection.

12. The coupling unit according to claim 1, wherein the detent ring is axially supported on a groove wall, which axially delimits the ring groove.

13. The coupling unit according to claim 1, wherein on a side axially facing away from the detent segments, the plurality of support segments are arranged adjacent in the circumferential direction and are axially supported within the ring groove of the casing.

14. The coupling unit according to claim 1, further comprising at least one marker configured on the casing and at least one corresponding marker configured on the at least one tubular section, wherein the markers are integrally formed on the casing and the respective tubular section.

15. A coupling unit, comprising:
a casing having an inner diameter surface with a ring groove formed therein;
a detent ring including a first rim having a first diameter and a second rim having a second diameter that is smaller than the first diameter, and the first rim is received in the ring groove of the casing; and
a tubular section having an outer diameter surface and an annular recess extending about a circumference of the outer diameter surface, and the tubular section further includes a plurality of reset contours that are disposed in the annular recess and circumferentially spaced apart from one another and a plurality of detent contours define a plurality of walls of the annular recess, and each reset contour is located in a circumferential direction between the detent contours;
wherein the first rim of the detent ring defines a plurality of support segments received in the ring groove of the casing, and the second rim extends radially inward from the support segments and includes a plurality of detent segments that define a plurality of recesses therebetween;
wherein the support segments of the detent ring define a plurality of recesses therebetween, and the casing has a plurality of projections that are received in the recesses when the detent ring is received in the ring groove of the casing;
wherein the tubular section is attached to the casing when the tubular section is disposed in a first relative rotational position with respect to the casing and inserted axially into the casing, the second rim of the detent rind configured to be received in the annular recess of the tubular section.

16. The coupling unit according to claim 15, wherein the reset contours extend radially outward at a height spanning the depth of the annular recess.

17. The coupling unit according to claim 15, wherein the plurality of reset contours is configured to deactivate the respective detent ring during the transition of the respective tubular section and the casing from the first rotational position into a second rotational position.

* * * * *